US011322154B2

(12) United States Patent
Ziv et al.

(10) Patent No.: US 11,322,154 B2
(45) Date of Patent: *May 3, 2022

(54) DIARIZATION USING LINGUISTIC LABELING

(71) Applicant: Verint Systems Ltd., Herzilya Pituach (IL)

(72) Inventors: Omer Ziv, Ramat Gan (IL); Ran Achituv, Hod Hasharon (IL); Ido Shapira, Tel Aviv (IL); Jeremie Dreyfuss, Tel Aviv (IL)

(73) Assignee: Verint Systems Inc., Melville, NY (US)

( * ) Notice: Subject to any disclaimer, the term of this patent is extended or adjusted under 35 U.S.C. 154(b) by 271 days.

This patent is subject to a terminal disclaimer.

(21) Appl. No.: 16/703,099

(22) Filed: Dec. 4, 2019

(65) Prior Publication Data

US 2020/0105277 A1  Apr. 2, 2020

Related U.S. Application Data

(63) Continuation of application No. 16/170,289, filed on Oct. 25, 2018, now Pat. No. 10,522,153, which is a (Continued)

(51) Int. Cl.
*G10L 15/26* (2006.01)
*G10L 17/00* (2013.01)
*G10L 17/02* (2013.01)

(52) U.S. Cl.
CPC .............. *G10L 17/00* (2013.01); *G10L 17/02* (2013.01)

(58) Field of Classification Search
CPC .......... G10L 15/26; G10L 17/00; G10L 17/02
See application file for complete search history.

(56) References Cited

U.S. PATENT DOCUMENTS 4,653,097 A 3/1987 Wantanabe et al.
4,864,566 A 9/1989 Chauveau
(Continued)

FOREIGN PATENT DOCUMENTS

EP 0598469 5/1994
JP 2004193942 7/2004
(Continued)

OTHER PUBLICATIONS

Baum, L.E., et al., "A Maximization Technique Occurring in the Statistical Analysis of Probabilistic Functions of Markov Chains," The Annals of Mathematical Statistics, vol. 41, No. 1, 1970, pp. 164-171.

(Continued)

*Primary Examiner* — Michael N Opsasnick
(74) *Attorney, Agent, or Firm* — Christopher M. Scherer; DeWitt LLP

(57) ABSTRACT

Systems and methods of diarization using linguistic labeling include receiving a set of diarized textual transcripts. At least one heuristic is automatedly applied to the diarized textual transcripts to select transcripts likely to be associated with an identified group of speakers. The selected transcripts are analyzed to create at least one linguistic model. The linguistic model is applied to transcripted audio data to label a portion of the transcripted audio data as having been spoken by the identified group of speakers. Still further embodiments of diarization using linguistic labeling may serve to label agent speech and customer speech in a recorded and transcribed customer service interaction.

20 Claims, 3 Drawing Sheets

Related U.S. Application Data continuation of application No. 14/084,976, filed on Nov. 20, 2013, now Pat. No. 10,134,401.

(60) Provisional application No. 61/729,064, filed on Nov. 21, 2012, provisional application No. 61/729,067, filed on Nov. 21, 2012.

(56) References Cited

U.S. PATENT DOCUMENTS

| | | | |
|---|---|---|---|
| 5,027,407 A | 6/1991 | Tsunoda | |
| 5,222,147 A | 6/1993 | Koyama | |
| 5,638,430 A | 6/1997 | Hogan et al. | |
| 5,805,674 A | 9/1998 | Anderson | |
| 5,907,602 A | 5/1999 | Peel et al. | |
| 5,946,654 A | 8/1999 | Newman et al. | |
| 5,963,908 A | 10/1999 | Chadha | |
| 5,999,525 A | 12/1999 | Krishnaswamy et al. | |
| 6,044,382 A | 3/2000 | Martino | |
| 6,145,083 A | 11/2000 | Shaffer et al. | |
| 6,266,640 B1 | 7/2001 | Fromm | |
| 6,275,806 B1 | 8/2001 | Pertrushin | |
| 6,427,137 B2 | 7/2002 | Petrushin | |
| 6,480,825 B1 | 11/2002 | Sharma et al. | |
| 6,510,415 B1 | 1/2003 | Talmor et al. | |
| 6,587,552 B1 | 7/2003 | Zimmerman | |
| 6,597,775 B2 | 7/2003 | Lawyer et al. | |
| 6,915,259 B2* | 7/2005 | Rigazio | G10L 15/07 704/234 |
| 7,006,605 B1 | 2/2006 | Morganstein et al. | |
| 7,039,951 B1 | 5/2006 | Chaudhari et al. | |
| 7,054,811 B2 | 5/2006 | Barzilay | |
| 7,106,843 B1 | 9/2006 | Gainsboro et al. | |
| 7,158,622 B2 | 1/2007 | Lawyer et al. | |
| 7,212,613 B2 | 5/2007 | Kim et al. | |
| 7,299,177 B2 | 11/2007 | Broman et al. | |
| 7,386,105 B2 | 6/2008 | Wasserblat et al. | |
| 7,403,922 B1 | 7/2008 | Lewis et al. | |
| 7,539,290 B2 | 5/2009 | Ortel | |
| 7,657,431 B2 | 2/2010 | Hayakawa | |
| 7,660,715 B1* | 2/2010 | Thambiratnam | G10L 15/065 704/244 |
| 7,668,769 B2 | 2/2010 | Baker et al. | |
| 7,693,965 B2 | 4/2010 | Rhoads | |
| 7,778,832 B2 | 8/2010 | Broman et al. | |
| 7,822,605 B2 | 10/2010 | Zigel et al. | |
| 7,908,645 B2 | 3/2011 | Varghese et al. | |
| 7,940,897 B2 | 5/2011 | Khor et al. | |
| 8,036,892 B2 | 10/2011 | Broman et al. | |
| 8,073,691 B2 | 12/2011 | Rajakumar | |
| 8,112,278 B2 | 2/2012 | Burke | |
| 8,259,910 B2 | 9/2012 | Afifi | |
| 8,311,826 B2 | 11/2012 | Rajakumar | |
| 8,417,233 B2 | 4/2013 | Woloshyn | |
| 8,510,215 B2 | 8/2013 | Gutierrez | |
| 8,537,978 B2 | 9/2013 | Jaiswal et al. | |
| 9,001,976 B2* | 4/2015 | Arrowood | G10L 15/07 379/88.01 |
| 10,134,400 B2* | 11/2018 | Ziv | G10L 17/00 |
| 10,134,401 B2 | 11/2018 | Ziv et al. | |
| 10,446,156 B2* | 10/2019 | Ziv | G10L 17/00 |
| 10,522,152 B2 | 12/2019 | Ziv et al. | |
| 10,522,153 B2* | 12/2019 | Ziv | G10L 17/00 |
| 10,593,332 B2 | 3/2020 | Ziv et al. | |
| 10,692,500 B2 | 6/2020 | Ziv et al. | |
| 10,950,241 B2 | 3/2021 | Ziv et al. | |
| 10,950,242 B2* | 3/2021 | Ziv | G10L 17/02 |
| 2001/0026632 A1 | 10/2001 | Tamai | |
| 2002/0022474 A1 | 2/2002 | Blom et al. | |
| 2002/0099649 A1 | 7/2002 | Lee et al. | |
| 2003/0009333 A1 | 1/2003 | Sharma et al. | |
| 2003/0050780 A1* | 3/2003 | Rigazio | G10L 15/07 704/246 |
| 2003/0050816 A1 | 3/2003 | Givens et al. | |
| 2003/0097593 A1 | 5/2003 | Sawa et al. | |
| 2003/0147516 A1 | 8/2003 | Lawyer et al. | |
| 2003/0208684 A1 | 11/2003 | Camacho et al. | |
| 2004/0029087 A1 | 2/2004 | White | |
| 2004/0111305 A1 | 6/2004 | Gavan et al. | |
| 2004/0131160 A1 | 7/2004 | Mardirossian | |
| 2004/0143635 A1 | 7/2004 | Galea | |
| 2004/0167964 A1 | 8/2004 | Rounthwaite et al. | |
| 2004/0203575 A1 | 10/2004 | Chin et al. | |
| 2004/0218751 A1 | 11/2004 | Colson et al. | |
| 2004/0240631 A1 | 12/2004 | Broman et al. | |
| 2005/0010411 A1* | 1/2005 | Rigazio | G10L 15/26 704/246 |
| 2005/0043014 A1 | 2/2005 | Hodge | |
| 2005/0076084 A1 | 4/2005 | Loughmiller et al. | |
| 2005/0125226 A1 | 6/2005 | Magee | |
| 2005/0125339 A1 | 6/2005 | Tidwell et al. | |
| 2005/0135595 A1* | 6/2005 | Bushey | H04M 3/5191 379/265.01 |
| 2005/0185779 A1 | 8/2005 | Toms | |
| 2006/0013372 A1 | 1/2006 | Russell | |
| 2006/0106605 A1 | 5/2006 | Saunders et al. | |
| 2006/0149558 A1* | 7/2006 | Kahn | G10L 15/063 704/278 |
| 2006/0161435 A1 | 7/2006 | Atef et al. | |
| 2006/0212407 A1 | 9/2006 | Lyon | |
| 2006/0212925 A1 | 9/2006 | Shull et al. | |
| 2006/0248019 A1 | 11/2006 | Rajakumar | |
| 2006/0251226 A1 | 11/2006 | Hogan et al. | |
| 2006/0282660 A1 | 12/2006 | Varghese et al. | |
| 2006/0285665 A1 | 12/2006 | Wasserblat et al. | |
| 2006/0289622 A1 | 12/2006 | Khor et al. | |
| 2006/0293891 A1 | 12/2006 | Pathuel | |
| 2007/0041517 A1 | 2/2007 | Clarke et al. | |
| 2007/0071206 A1 | 3/2007 | Gainsboro et al. | |
| 2007/0074021 A1 | 3/2007 | Smithies et al. | |
| 2007/0100608 A1 | 5/2007 | Gable et al. | |
| 2007/0124246 A1 | 5/2007 | Lawyer et al. | |
| 2007/0239837 A1 | 10/2007 | Jablokov | |
| 2007/0244702 A1 | 10/2007 | Kahn et al. | |
| 2007/0280436 A1 | 12/2007 | Rajakumar | |
| 2007/0282605 A1 | 12/2007 | Rajakumar | |
| 2007/0288242 A1* | 12/2007 | Spengler | G10L 15/20 704/275 |
| 2008/0010066 A1 | 1/2008 | Broman et al. | |
| 2008/0181417 A1* | 7/2008 | Pereg | G10L 25/00 381/17 |
| 2008/0195387 A1 | 8/2008 | Zigel et al. | |
| 2008/0222734 A1 | 9/2008 | Redlich et al. | |
| 2009/0046841 A1 | 2/2009 | Hodge | |
| 2009/0119106 A1 | 5/2009 | Rajakumar | |
| 2009/0147939 A1 | 6/2009 | Morganstein et al. | |
| 2009/0232284 A1 | 9/2009 | Afifi | |
| 2009/0247131 A1 | 10/2009 | Champion et al. | |
| 2009/0254971 A1 | 10/2009 | Herz et al. | |
| 2009/0319269 A1 | 12/2009 | Aronowitz | |
| 2010/0138282 A1* | 6/2010 | Kannan | G06Q 10/06398 705/7.42 |
| 2010/0228656 A1 | 9/2010 | Wasserblat et al. | |
| 2010/0303211 A1 | 12/2010 | Hartig | |
| 2010/0305946 A1 | 12/2010 | Gutierrez | |
| 2010/0305960 A1 | 12/2010 | Gutierrez | |
| 2010/0332287 A1* | 12/2010 | Gates | G06F 17/277 705/7.32 |
| 2011/0004472 A1 | 1/2011 | Zlokarnik | |
| 2011/0026689 A1 | 2/2011 | Metz et al. | |
| 2011/0119060 A1 | 5/2011 | Aronowitz | |
| 2011/0191106 A1 | 8/2011 | Khor et al. | |
| 2011/0255676 A1 | 10/2011 | Marchand et al. | |
| 2011/0282661 A1 | 11/2011 | Dobry et al. | |
| 2011/0282778 A1 | 11/2011 | Wright et al. | |
| 2011/0320484 A1 | 12/2011 | Smithies et al. | |
| 2012/0053939 A9 | 3/2012 | Gutierrez et al. | |
| 2012/0054202 A1 | 3/2012 | Rajakumar | |
| 2012/0072453 A1 | 3/2012 | Guerra et al. | |
| 2012/0130771 A1* | 5/2012 | Kannan | G06Q 10/06398 705/7.32 |
| 2012/0253805 A1 | 10/2012 | Rajakumar et al. | |
| 2012/0254243 A1 | 10/2012 | Zeppenfeld et al. | |

(56) References Cited

U.S. PATENT DOCUMENTS

| | | | |
|---|---|---|---|
| 2012/0263285 A1 | 10/2012 | Rajakumar et al. | |
| 2012/0284026 A1 | 11/2012 | Cardillo et al. | |
| 2013/0163737 A1 | 6/2013 | Dement et al. | |
| 2013/0197912 A1 | 8/2013 | Hathaway et al. | |
| 2013/0253919 A1 | 9/2013 | Gutierrez et al. | |
| 2013/0300939 A1 | 11/2013 | Chou et al. | |
| 2014/0067394 A1 | 3/2014 | Abuzeina | |
| 2014/0142940 A1 | 5/2014 | Ziv et al. | |
| 2015/0055763 A1 | 2/2015 | Guerra et al. | |
| 2016/0364606 A1* | 12/2016 | Conway | G06K 9/00302 |
| 2016/0379032 A1* | 12/2016 | Mo | G06K 9/0002 382/124 |

FOREIGN PATENT DOCUMENTS

| | | |
|---|---|---|
| JP | 2006038955 | 9/2006 |
| WO | 2000077772 | 12/2000 |
| WO | 2004079501 | 9/2004 |
| WO | 2006013555 | 2/2006 |
| WO | 2007001452 | 1/2007 |

OTHER PUBLICATIONS

Cheng, Y., "Mean Shift, Mode Seeking, and Clustering," IEEE Transactions on Pattern Analysis and Machine Intelligence, vol. 17, No. 8, 1995, pp. 790-799.

Cohen, I., "Noise Spectrum Estimation in Adverse Environment: Improved Minima Controlled Recursive Averaging," IEEE Transactions On Speech and Audio Processing, vol. 11, No. 5, 2003, pp. 466-475.

Cohen, I., et al., "Spectral Enhancement by Tracking Speech Presence Probability in Subbands," Proc. International Workshop in Hand-Free Speech Communication (HSC'01), 2001, pp. 95-98.

Coifman, R.R., et al., "Diffusion maps," Applied and Computational Harmonic Analysis, vol. 21, 2006, pp. 5-30.

Hayes, M.H., "Statistical Digital Signal Processing and Modeling," J. Wiley & Sons, Inc., New York, 1996, 200 pages.

Hermansky, H., "Perceptual linear predictive (PLP) analysis of speech," Journal of the Acoustical Society of America, vol. 87, No. 4, 1990, pp. 1738-1752.

Lailler, C., et al., "Semi-Supervised and Unsupervised Data Extraction Targeting Speakers: From Speaker Roles to Fame?," Proceedings of the First Workshop on Speech, Language and Audio in Multimedia (SLAM), Marseille, France, 2013, 6 pages.

Mermelstein, P., "Distance Measures for Speech Recognition—Psychological and Instrumental," Pattern Recognition and Artificial Intelligence, 1976, pp. 374-388.

Schmalenstroeer, J., et al., "Online Diarization of Streaming Audio-Visual Data for Smart Environments," IEEE Journal of Selected Topics in Signal Processing, vol. 4, No. 5, 2010, 12 pages.

Viterbi, A.J., "Error Bounds for Convolutional Codes and an Asymptotically Optimum Decoding Algorithm," IEEE Transactions on Information Theory, vol. 13, No. 2, 1967, pp. 260-269.

Notice of Allowance dated Oct. 26, 2020, in connection with related U.S. Appl. No. 16/703,245.

\* cited by examiner

DIARIZATION USING LINGUISTIC LABELING

CROSS-REFERENCE TO RELATED APPLICATIONS

The present application is a continuation of U.S. application Ser. No. 16/170,289, filed Oct. 25, 2018, which application is a continuation of U.S. patent application Ser. No. 14/084,976, filed on Nov. 20, 2013, which application claims priority of U.S. Provisional Patent Application No. 61/729,064, filed on Nov. 21, 2012, and 61/729,067 filed Nov. 21, 2012, the contents of which are incorporated herein by reference in their entireties.

BACKGROUND

The present disclosure is related to the field of automated transcription. More specifically, the present disclosure is related to diarization using linguistic labeling.

Speech transcription and speech analytics of audio data may be enhanced by a process of diarization wherein audio data that contains multiple speakers is separated into segments of audio data typically to a single speaker. While speaker separation in diarization facilitates later transcription and/or speech analytics, further identification or discrimination between the identified speakers can further facilitate these processes by enabling the association of further context and information in later transcription and speech analytics processes specific to an identified speaker.

Systems and methods as disclosed herein present solutions to improve diarization using linguistic models to identify and label at least one speaker separated from the audio data.

BRIEF DISCLOSURE

An embodiment of a method of diarization of audio data includes receiving a set of diarized textual transcripts. At least one heuristic is automatically applied to the diarized textual transcripts to select transcripts likely to be associated with an identified group of speakers. The selected transcripts are analyzed to create at least one linguistic model. A linguistic model is applied to transcripted audio data to label a portion of the transcripted audio data as having been spoken by the identified group of speakers.

An exemplary embodiment of a method of diarization of audio data from a customer service interaction between at least an agent and a customer includes receiving a set of diarized textual transcripts of customer service interactions between at least an agent and a customer. The diarized textual transcripts are group in pluralities compromising at least a transcript associated to the agent and a transcript associated to the customer. At least one heuristic is automatedly applied to the diarized textual transcripts to select at least one of the transcripts in each plurality as being associated to the agent. The selected transcripts are analyzed to create at least one linguistic model. A linguistic model is applied to transcripted audio data to label a portion of the transcripted audio data as having been spoken by the agent.

Exemplarily embodiment of a system for diarization and labeling of audio data includes a database comprising a plurality of audio files. A transcription server transcribes and diarizes the audio files of the plurality of audio files into a plurality of groups comprising at least two diarized textual transcripts. A processor automatedly applies at least one heuristic to the diarized textual transcripts to select at least one of the transcripts in each group as being associated to an identified group of speakers and analyze the selected transcripts to create at least one linguistic model indicative of the identified group of speakers. An audio source provides new transcripted audio data to the processor. The processor applies the linguistic model to the transcripted audio data to label a portion of the transcripted audio data as being associated with the identified group of speakers.

DETAILED DISCLOSURE

Speech transcription and speech analytics of an audio stream are enhanced by diarization wherein a speaker identity is identified and associated with speech segments. A speaker diarization system and method is aimed at identifying the speakers in a given call and associating each speech segment with an identified speaker.

Embodiments of a diarization process disclosed herein include a first step of a speech-to-text transcription of an audio file to be diarized. Next, a "blind" diarization of the audio file is performed. The audio file is exemplarily a .WAV file. The blind diarization receives the audio file and optionally an information file from the speech-to-text transcription that includes at least a partial transcription of the audio file as inputs. Each audio segment or term in the information file is associated between speakers based upon identified acoustic or textual features. This diarization is characterized as "blind" as the diarization is performed prior to an identification of the speakers. In an exemplary embodiment of a customer service call, the "blind" diarization may only identify speakers while it may still be undetermined which speaker is the agent and which speaker is the customer.

The blind diarization is followed by an agent diarization wherein an agent model that represents the speech and/or information content of the agent speaker is compared to the identified speech segments associated with the separated speakers. Through this comparison, one speaker can be identified as an agent, while the other speaker is identified as the customer. One way in which one speaker can be identified as an agent is by linguistically modeling the agent side of a conversation, and comparatively using this model to identify segments of the transcription attributed to the agent.

The identification of segments attributed to a single speaker in an audio file, such as an audio stream or recording (e.g. telephone call that contains speech) can facilitate increased accuracy in transcription, diarization, speaker adaption, and/or speech analytics of the audio file. An initial transcription, exemplarily from a fast speech-to-text engine, can be used to more accurately identify speech segments in an audio file, such as an audio stream or recording, resulting in more accurate diarization and/or speech adaptation. In some embodiments, the transcription may be optimized for speed rather than accuracy.

Figure 1:
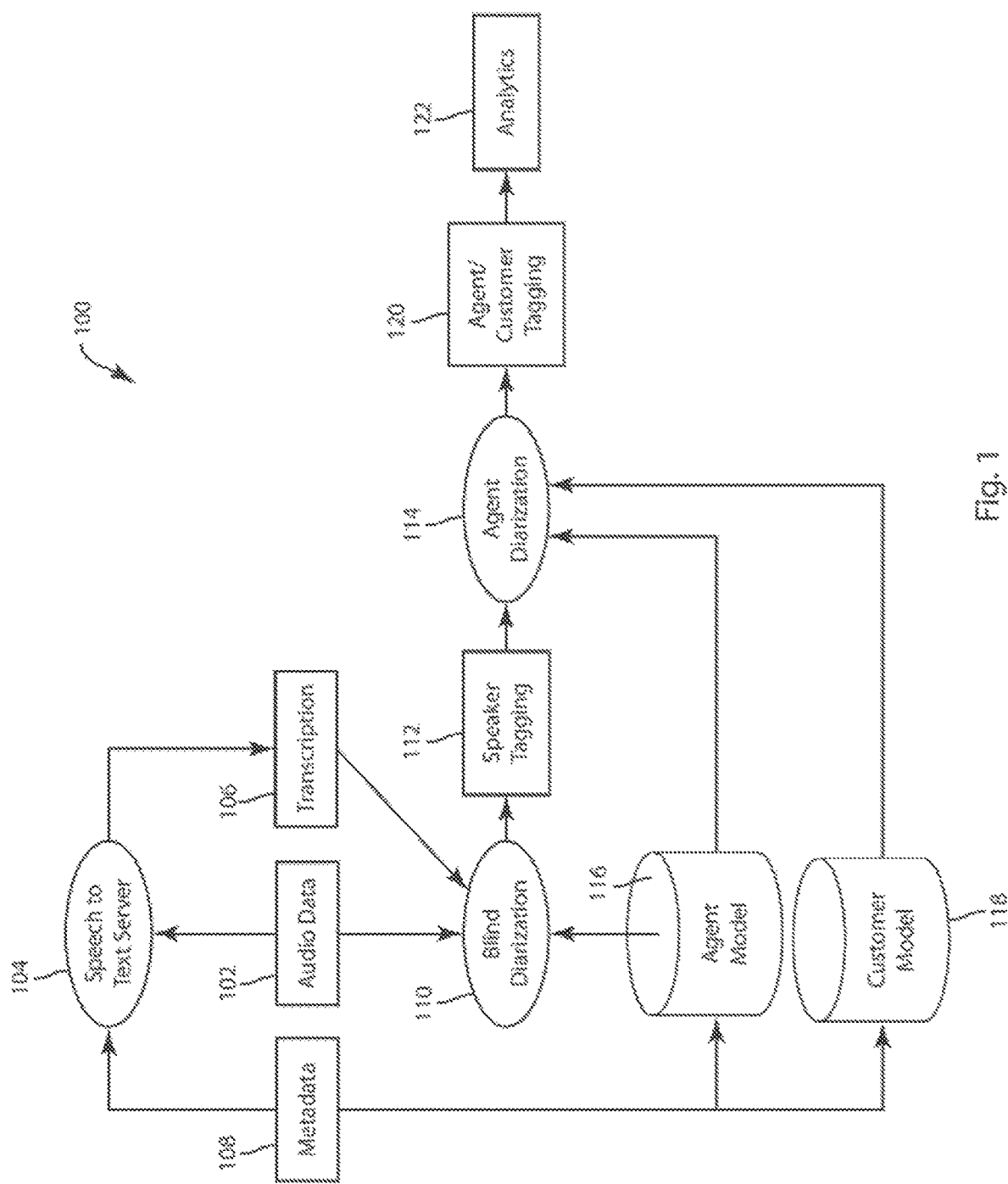
FIG. 1 is a flow chart that depicts an embodiment of a method of diarization.
Figure 2:
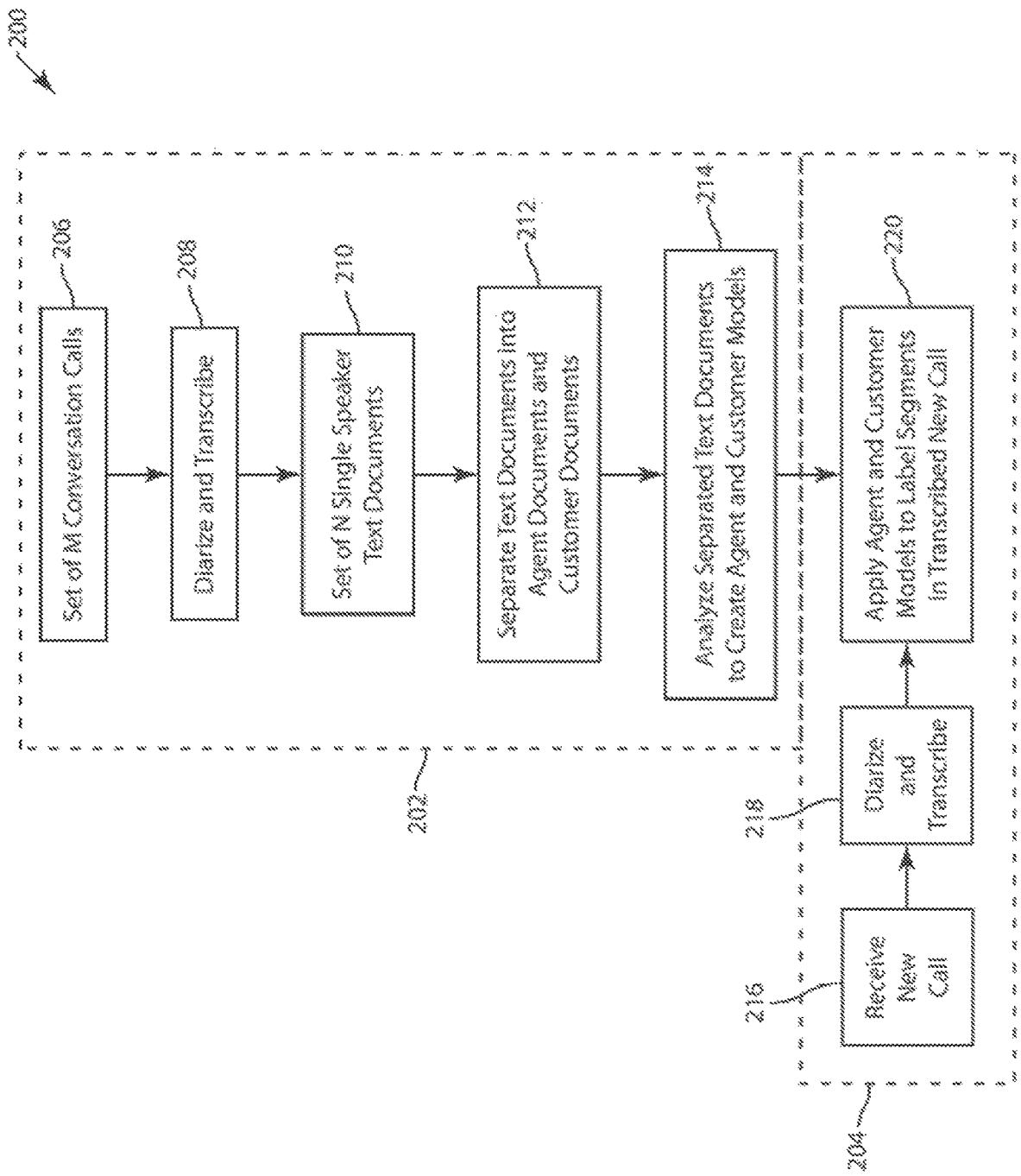
FIG. 2 is a flow chart that depicts an embodiment of creating and using an agent linguistic model.
Figure 3:
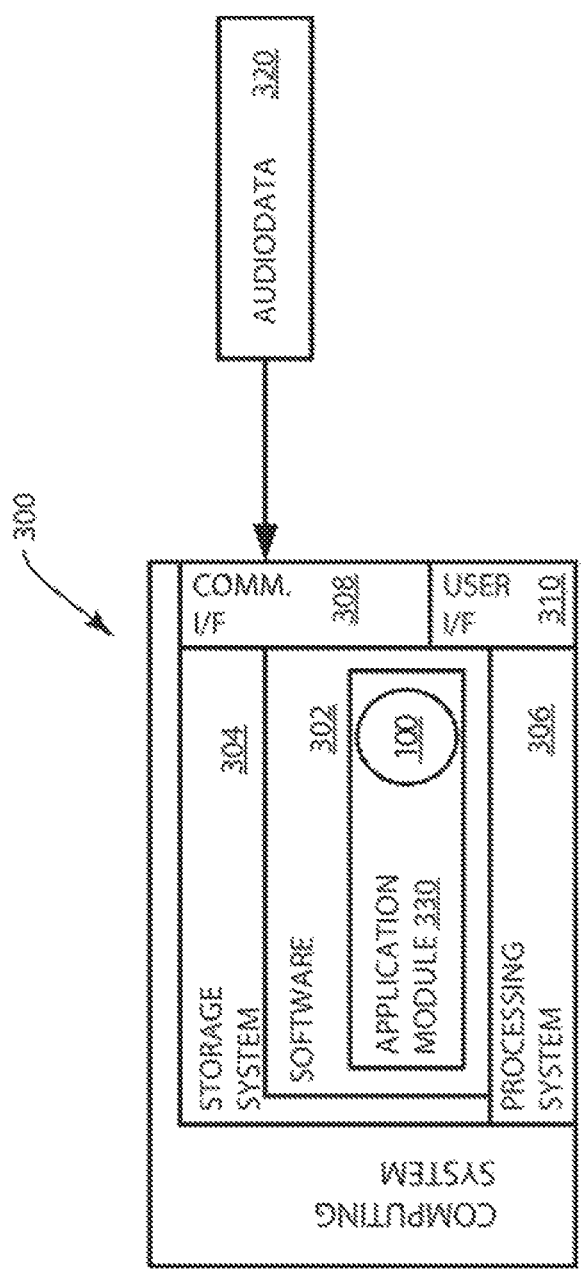
FIG. 3 is a system diagram of an exemplary embodiment of a system of diarization of audio files.

FIGS. 1 and 2 are flow charts that respectively depict exemplary embodiments of method 100 of diarization and a method 200 of creating and using an a linguistic model. FIG. 3 is a system diagram of an exemplary embodiment of a system 300 for creating and using a linguistic model. The system 300 is generally a computing system that includes a processing system 306, storage system 304, software 302, communication interface 308 and a user interface 310. The processing system 306 loads and executes software 302 from the storage system 304, including a software module 330. When executed by the computing system 300, software module 330 directs the processing system 306 to operate as described in herein in further detail in accordance with the method 100 and alternatively the method 200.

Although the computing system 300 as depicted in FIG. 3 includes one software module in the present example, it should be understood that one or more modules could provide the same operation. Similarly, while description as provided herein refers to a computing system 300 and a processing system 306, it is to be recognized that implementations of such systems can be performed using one or more processors, which may be communicatively connected, and such implementations are considered to be within the scope of the description.

The processing system 306 can comprise a microprocessor and other circuitry that retrieves and executes software 302 from storage system 304. Processing system 306 can be implemented within a single processing device but can also be distributed across multiple processing devices or subsystems that cooperate in existing program instructions. Examples of processing system 306 include general purpose central processing units, application specific processors, and logic devices, as well as any other type of processing device, combinations of processing devices, or variations thereof.

The storage system 304 can comprise any storage media readable by processing system 306, and capable of storing software 302. The storage system 304 can include volatile and non-volatile, removable and non-removable media implemented in any method or technology for storage of information, such as computer readable instructions, data structures, program modules, or other data. Storage system 304 can be implemented as a single storage device but may also be implemented across multiple storage devices or sub-systems. Storage system 304 can further include additional elements, such as a controller capable of communicating with the processing system 306.

Examples of storage media include random access memory, read only memory, magnetic discs, optical discs, flash memory, virtual memory, and non-virtual memory, magnetic sets, magnetic tape, magnetic disc storage or other magnetic storage devices, or any other medium which can be used to storage the desired information and that may be accessed by an instruction execution system, as well as any combination or variation thereof, or any other type of storage medium. In some implementations, the storage media can be a non-transitory storage media. In some implementations, at least a portion of the storage media may be transitory. It should be understood that in no case is the storage media a propagated signal.

User interface 310 can include a mouse, a keyboard, a voice input device, a touch input device for receiving a gesture from a user, a motion input device for detecting non-touch gestures and other motions by a user, and other comparable input devices and associated processing elements capable of receiving user input from a user. Output devices such as a video display or graphical display can display an interface further associated with embodiments of the system and method as disclosed herein. Speakers, printers, haptic devices and other types of output devices may also be included in the user interface 310.

As described in further detail herein, the computing system 200 receives an audio file 320. The audio file 320 may be an audio recording or a conversation, which may exemplarily be between two speakers, although the audio recording may be any of a variety of other audio records, including multiple speakers, a single speaker, or an automated or recorded auditory message. In still further embodiments, the audio file may be streaming audio data received in real time or near-real time by the computing system 300.

FIG. 1 is a flow chart that depicts an embodiment of a method of diarization 100. Audio data 102 is an audio recording of a conversation exemplarily between two or more speakers. The audio data may exemplarily be a .WAV file, but may also be other types of audio or video formats, for example pulse code modulated (PCM) format and linear pulse code modulated (LPCM) audio files. Furthermore, the audio data is exemplarily a mono audio file; however, it is recognized that embodiments of the method disclosed herein may also be used with stereo audio files. One feature of the method disclosed herein is that speaker separation in diarization can be achieved in mono audio files where stereo speaker separation techniques are not available.

In embodiments, the audio data 102 further comprises, or is associated to, metadata 108. The metadata 108 can exemplarily include data indicative of a subject, content, or participant in the audio data 102. In alternative embodiments, the metadata 108 may provide information regarding context or content of the audio data 102, including a topic, time, date, or location etc.

The audio data 102 and the metadata 108 are provided to a speech-to-text (STT) server 104, which may employ any of a variety of method of techniques for automatic speech recognition (ASR) to create an automated speech-to-text transcription 106 from the audio file. The transcription performed by the STT server at 104 can exemplarily be a large-vocabulary continuous speech recognition (LVCSR) and the audio data 102 provided to the STT server 104 can alternatively be a previously recorded audio file or can be streaming audio data obtained from an ongoing communication between two speakers. In an exemplary embodiment, the STT server 104 may use the received metadata 108 to select one or more models or techniques for producing the automated transcription. In a non-limiting example, an identification of one of the speakers in the audio data can be used to select a topical linguistic model based upon a content area associated with the speaker. Such content areas may be technological, customer service, medical, legal, or other contextually based models. In addition to the transcription 106 from the STT server 104, STT server 104 may also output time stamps associated with particular transcription segments, words, or phrases, and may also include a confidence score in the automated transcription. The transcription 106 may also identify homogeneous speaker speech segments. Homogenous speech segments are those segments of the transcription that have a high likelihood of originating from a single speaker. The speech segments may exemplarily correspond to phonemes, words, or sentences.

After the transcription 106 is created, both the audio data 102 and the transcription 106 are used for a blind diarization at 110. The diarization is characterized as blind as the identities of the speakers (e.g. agent, customer) are not known at this stage and therefore the diarization 110 merely discriminates between a first speaker (speaker 1) and a second speaker (speaker 2), or more. Additionally, in some embodiments, those segments for which a speaker cannot be reliably determined may be labeled as being of an unknown speaker.

An embodiment of the blind diarization at 110 receives the mono audio data 102 and the transcription 106 and begins with the assumption that there are two main speakers in the audio file. The homogeneous speaker segments from the transcription 106 are identified in the audio file. Then, long homogeneous speaker segments can be split into sub-segments if long silent intervals are found within a single segment. The sub-segments are selected to avoid splitting the long speaker segments within a word. The transcription 106 can provide context to where individual words start and end. After the audio file has been segmented based upon both the audio file 102 and the transcription 106, the identified segments are clustered into speakers (e.g. speaker 1 and speaker 2).

In an embodiment, the blind diarization uses voice activity detection (VAD) to segment the audio data 102 into utterances or short segments of audio data with a likelihood of emanating from a single speaker. In an embodiment, the VAD segments the audio data into utterances by identifying segments of speech separated by segments of non-speech on a frame-by-frame basis. Context provided by the transcription 106 can improve the distinction between speech and not speech segments. In the VAD an audio frame may be identified as speech or non-speech based upon a plurality of heuristics or probabilities exemplarily based upon mean energy, band energy, peakiness, residual energy or using the fast transcription; however, it will be recognized that alternative heuristics or probabilities may be used in alternative embodiments.

The blind diarization at 110 results in the homogenous speaker segments of the audio data (and the associated portion of the transcription 106) being tagged at 112 as being associated to a first speaker or a second speaker. As mentioned above, in some embodiments, more than two speakers may be tagged, while in other embodiments, some segments may be tagged as "unknown." It is to be understood that in some embodiments the audio data may be diarized first and then transcribed, or transcribed first and then diarized. In either embodiment, the audio data/transcription portions tagged at 112 are further processed by a more detailed diarization at 114 to label the separated speakers.

The separation of spoken content into different speaker sides requires the additional information provided by the agent model, the customer model, or both models in order to label which side of a conversation is the agent and which is the customer. A linguistic agent model 116 can be created using the transcripts, such as those produced by the STT server 104 depicted in FIG. 1, or in other embodiments, as disclosed herein from a stored database of customer service interaction transcripts, exemplarily obtained from customer service interactions across a facility or organization. It is recognized that in alternative embodiments, only transcripts from a single specific agent may be considered. A linguistic agent model identifies language and language patterns that are unique or highly correlated to the agent side of a conversation. In some embodiments, similar identification of language correlated to the customer side of a conversation is identified and complied into the customer model 118. The combination of one or more of these linguistic models are then used in comparison to the segmented transcript to distinguish between the agent and the customer, such as after a blind diarization.

When a customer service agent's speech is highly scripted, the linguistic patterns found in the script can be used to identify the agent side of a conversation. A script is usually defined as a long stretch of words which is employed by many agents and is dictated by the company (e.g. " . . . customer services this is [name] speaking how can I help you . . . "). Due to the linguistic properties of a conversation, it is rare to find a relatively long (e.g. five or more, seven or more, ten or more) stretch of words repeated over many conversations and across agents. Therefore, if such a long stretch of words is repeatedly identified in one side of a conversation, then there is an increased probability that this represents a script that is being repeated by an agent in the course of business.

However, in order to be responsive to customer needs, the number of actual scripts used by an organization is usually small and agents are likely to personalize or modify the script in order to make the script more naturally fit into the conversation. Therefore, without supplementation, reliance solely upon scripts may lead to inaccurate agent labeling as many conversations go unlabeled as no close enough matches to the scripts are found in either side of the conversations.

Therefore, in an embodiment, in addition to the identification and use of scripts in diarization, the agents' linguistic speech patterns can be distinguished by the use of specific words, small phrases, or expressions, (e.g. "sir", "apologize", "account number", "let me transfer you", "what I'll do is", "let me see if", or others). Shorter linguistic elements such as these constitute an agent linguistic cloud, that may be correlated to agent speech, but may also have a higher chance to appear in the customer side of a conversation, either by chance, or due to error in the transcription, blind diarization, or speaker separation.

In one embodiment, the difference between these two techniques can be summarized as while script analysis looks for specific sequences of words, the agent linguistic cloud approach looks more towards the specific words used, and their frequency by one side in a conversation. A robust linguistic model uses both approaches in order to maximize the ability of the model to discriminate between agent and customer speech.

At 114 the agent model 116, and in some embodiments a customer model 118, are applied to the transcript clusters resulting from the speaker tagging 112. It will be recognized that in embodiments, the transcription and the blind diarization may occur in either order. In embodiments wherein the transcription is performed first, the transcription can assist in the blind diarization while embodiments wherein the blind diarization is performed first, this diarized audio can facilities transcription. In any event, the agent diarization at 114 is provided with clustered segments of transcription that has been determined to have ordinated from a single speaker. To these clusters the agent model 116 and customer model 118 are applied and a determination is made as to which of the models, the clustered transcriptions best match. As a result from this comparison, one side of the conversation is tagged as the agent at 120 while the other side is tagged as the customer. In embodiments wherein only an agent model is used, the transcription data that is not selected as being more correlated to the agent model is tagged as being associated to the customer. After the transcription has been tagged between agent and customer speech at 120, this transcription can further be used in analytics at 122 as the labeling of the diarized conversation can facilitate more focused analysis, exemplarily on solely agent speech or solely customer speech.

FIG. 2 is a diagram that depicts an embodiment of a method 200 creating and using a linguistic model for labeling 200. The diagram of FIG. 2 can be generally separated into two portions, a training portion 202 in which the agent linguistic model is created, and a labeling portion 204 in which the agent linguistic model is applied to a diarized conversation in order to identify the speakers in the conversation as an agent or a customer.

Starting with 202, a set of M recorded conversations are selected at 206. The set of recorded conversations can be a predetermined number (e.g. 1,000), or can be a temporally determined number (e.g. the conversations recorded within the last week or 100 hours of conversation), or a subset thereof. It is understood that these numbers are merely exemplary of the size of the set and not intended to be limiting. The recorded conversations may all be stored at a repository at a computer readable medium connected to a server and in communication with one or more computers in a network.

In embodiments, the set of recorded conversations may be further processed and reduced, exemplarily by performing an automated analysis of transcription quality. Exemplary embodiments of such automated techniques may include autocorrelation signal analysts. As previously mentioned above, the speech to text server may also output a confidence score in the transcription along with the transcription. In an exemplary embodiment, only those transcriptions deemed to be of a particular high quality or high confidence are selected to be used at 206.

The selected set of recorded conversations are diarized and transcribed at 208. In embodiments, the transcription and diarization may be performed in the manner as disclosed above with respect to FIG. 1, or in a manner similar to that as described. In an alternative embodiment, when the recorded conversations in the sets selected at 206 are actual calls recorded and analyzed by a company or organization, the transcription and diarization may already be performed as part of the original use and analysis of the audio recording of the conversation and therefore the diarization and transcription may be already stored in the repository with, or associated with, the audio file.

At 210, the results of the transcription and diarization at 208 are separated into a plurality of text documents wherein each document contains the text transcript of one speaker side of a conversation. Therefore, due to the nature of conversation, the number of text documents 210 is larger than the number of audio files in the set selected at 206 as each audio file will likely be split into two, if not more, text documents. This results in a set of N single speaker text documents where N<M.

At 212 the text documents produced at 210 are analyzed to identify linguistic patterns typically used by agents and/or patterns used by customers. This analysis can be performed using some type of heuristic such as, but not limited to, identifying repetitive long phrases that are highly correlated to an agent side of a conversation. In one embodiment, long scripted combinations of words are extracted. Script extraction and identification produces highly reliable results when a known script segment is identified; however, script extraction and labeling can result in many files being identified as unknown or indeterminate when insufficient matches to the extracted script text are identified.

The script extraction can be performed by analyzing the text documents from 210 to identify lists of word strings of a predetermined length (e.g. five, seven, or ten words) and the frequency among the text files with which these word combinations appear. It will be understood that adjustments to the word string length, when lower, will create a model that identifies more text files as being on an agent side, while longer word string lengths will increase the accuracy that the identified text files are spoken by agents.

In an exemplary embodiment, identification of a script or other heuristics such as other repetitive words or phrases in a text file is indicative of a file having been spoken by an agent. As referenced above, when a script or another heuristic can be identified in a text file, this can produce a highly reliable identification of agent speech; however, such a technique is limited in that many other files of agent speech may be missed. Therefore, in an embodiment, the model training at 202 further selects only those text files that included a script and therefore were highly likely to have been spoken by an agent for further processing as disclosed herein at 214 to create the more robust agent linguistic model.

At 214, the linguistic model can be refined and/or extended beyond the basic script identification and furthermore in embodiments an agent linguistic model and a customer linguistic model may be created. This may exemplarily be performed by using the basic script identification as labeled training data for any standard supervised learning classifier. In embodiments of the systems and methods as disclosed herein, the agent scripts extracted from 212 can be used to create an agent subset of the text documents from 210. In such applications, the extracted scripts 212 are applied to the text documents from 210 in order to identify a subset of text documents that can be accurately known to be the agent side of conversations. This application can be performed by representing each of the text documents as a long string produced by the concatenation of all the words spoken by a speaker in the conversation, and the text document is associated with the text document that represents the other speaker side of the conversation in a group. For each side of the conversation, all of the extracted scripts from 212 are iterated over the text files in order to identify extracted scripts in the text files and a score is given to the identification of the script within the text file indicating the closeness of the script to the text identified in the text file. Each text file representing one side of the conversation is given a final score based upon the identified scripts in that text file and the text files representing two halves of the conversation are compared to one another to determine which half of the conversation has a higher score which is indicative of the agent side of the conversation. If the difference between the two scores is above a minimal separation threshold, then the text file identified to be the agent side of the conversation based upon the script analysis is added to the subset that may be used in the manner described below with the creation of an agent linguistic cloud.

As described above, after the subset of text files that are highly likely to be agent sides of conversations has been identified, the subset can be analyzed in order to create an agent linguistic model based as a linguistic cloud of word frequencies. In exemplary embodiments, the word frequencies in the linguistic cloud can be extended to joint distributions of word frequencies to capture frequencies not only of particular words, but phrases or sequences of words. When used for speaker labeling, embodiments of the agent linguistic model can result in fewer unidentified, unknown, or inconclusively labeled text files, but due to the nature of a conversation, transcript, or diarization, embodiments can have less accuracy than those identifications made using the extracted script model.

In addition to the use of scripts by a customer service agent, the agent's speech can be distinguished by the use of certain words, short phrases, or expressions. Shorter elements, including, but not limited to, unigrams, bigrams, and trigrams that are more correlated or prevalent in agent's side of conversation. By automatically creating the subset where the agent side has been identified in the conversation as disclosed above, the unigrams, bigrams, and trigrams obtained from this subset are more accurately known to come from the agent and thus can capture increased variability in the agent sides of the conversation.

In an embodiment, unigrams, bigrams, trigrams, words, or phrases that are more prominent to the agent are extracted similar to the manner as described above with respect to the script extractions. In an embodiment, those unigrams, bigrams, trigrams, words, or phrases that both occur frequently in the agent sides of the subset and appear more frequently in the agent sides of the subset than the corresponding customer sides of the conversation by at least a predetermined amount, may be added to the agent linguistic cloud model. Once all of the elements for the agent linguistic cloud model have been extracted, these elements, in addition to the previously extracted scripts, are all written in a text file as the agent linguistic model that can be used in the labeling portion 204 as shown in FIG. 2. A similar process may be used to create the customer linguistic model.

At 204 the created agent linguistic model which may contain elements of both the script and cloud techniques (and in embodiments, the customer linguistic model) are applied to a new call in order to diarize and label between an agent and a caller in the new call. In 204 a new call 216 is received and recorded or otherwise transformed into an audio file. It is to be recognized that embodiments, the labeling of 204 can be performed in real time or near-real time as the conversation is taking place, or may occur after the fact when the completed conversation is stored as an audio file. The new call 216 is diarized and transcribed at 218 which may occur in a similar manner as described above with respect to FIG. 1 and particularly 108, 110, and 112 at FIG. 1. As the result of such a blind diarization as exemplarily described above, the system and method still requires to identify which speaker is the agent and which speaker is the customer. This is performed in an agent diarization at 220 by applying the agent linguistic model and customer linguistic model created in 202 to the diarized transcript. In application at 220, the agent linguistic model is applied to both of the sides of the conversation and counted or weighted based upon the number of language specific patterns from the agent linguistic model are identified in each of the conversation halves identified as a first speaker and a second speaker. The conversation half with the higher score is identified as the agent and the other speaker of the other conversation half is identified as the customer.

It will be understood that in some embodiments of methods as disclosed herein, an agent linguistic model may be used in conjunction with other agent models, exemplarily an agent acoustical model that models specific acoustical traits attributed to a specific agent known to be one of the speakers in a conversation. Examples of acoustical voiceprint models are exemplarily disclosed in U.S. Provisional Patent Application No. 61/729,064 filed on Nov. 21, 2012, which is hereby incorporated by reference in its entirety. In some embodiments, linguistic models and acoustic models may be applied in an "and" fashion or an "or" fashion, while in still further embodiments, the different models are performed in a particular sequence in order to maximize the advantages of both models.

In exemplary embodiments of combined use of a linguistic model and an acoustic voiceprint model, the application of the models may be performed in parallel, or in conjunction. If the models are performed in parallel, the resulting speaker diarization and labeling from each of the models can be compared before making a final determination on the labeling. In such an exemplary embodiment, if both models agree on the speaker label, then that label is used, while if the separate models disagree, then further evaluation or analysis may be undertaken in order to determine which model is more reliable or more likely to be correct based upon further context of the audio data. Such an exemplary embodiment may offer the advantages of both acoustic and linguistic modeling and speaker separation techniques. In exemplary embodiments, linguistic models may be better at making a distinction between agent speech and customer speech, while acoustic models may be better at discriminating between speakers in a specific audio file.

In a still further embodiment, the combination of both an acoustic voiceprint model and a linguistic model can help to identify errors in the blind diarization or the speaker separation phases, exemplarily by highlighting portions of the audio data and transcription within which the two models disagree and for facilitating a more detailed analysis in those areas in order to arrive at the correct diarization in speaker labeling. Similarly, the use of an additional acoustic model may provide a backup for instance wherein a linguistic model is not available. Such an exemplary embodiment may occur when analyzing audio data of an unknown topic or before a linguistic model can be created, such as described above with respect to FIG. 2.

In still further embodiments, the use of a combination of acoustic and linguistic models may help in the identification and separation of speakers in audio data that contain more than two speakers, exemplarily, one customer service agent and two customers; two agents, and one customer, or an agent, a customer, and an automated recording. As mentioned above, embodiments of a linguistic model may have strength in discriminating between agent speech and customer speech while an acoustic model may better distinguish between two similar speakers, exemplarily between two agents or two customers, or an agent and a recorded voice message.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A non-transitory computer-readable medium having instructions stored thereon for facilitating diarization of audio files from a customer service interaction, wherein the instructions, when executed by a processing system, direct the processing system to:
   receive a set of textual transcripts from a transcription server and a set of audio files associated with the set of textual transcripts from an audio database server;
   perform a blind diarization on the set of textual transcripts and the set of audio files to segment and cluster the textual transcripts into a plurality of textual speaker clusters, wherein the number of textual speaker clusters is at least equal to a number of speakers in the textual transcript;
   automatedly apply at least one heuristic to the textual speaker clusters to select textual speaker clusters likely to be associated with an identified group of speakers;
   analyze the selected textual speaker clusters to create at least one linguistic model;

apply the linguistic model to transcribed audio data with the processor to label a portion of the transcribed audio data as having been spoken by the identified group of speakers;

save the at least one linguistic model to a linguistic database server and associating it with the labeled speaker;

receive a new textual transcript from the transcription server and a new audio file associated with the new textual transcript from the audio database server;

receive the at least one linguistic model from the linguistic database server;

receive at least one acoustic voiceprint associated with a specific speaker from a voiceprint database server;

apply the received at least one linguistic model from the linguistic database server to the new audio file transcript from an audio source to perform diarization of the new audio file by blind diarizing the new audio file and new textual transcript, comparing each new textual speaker cluster to the at least one linguistic model, and labeling each textual speaker cluster as belonging to a customer service agent or belonging to a customer, comparing each audio speaker segment to the at least one acoustic voiceprint, and labeling each audio speaker segment as belonging to a known speaker or belonging to an unknown speaker;

when one of the audio speaker segments is labeled as belonging to a known speaker, select and transcribing the labeled audio speaker segments with the transcription server;

compare the selected transcribed labeled audio speaker segments to the textual speaker clusters labeled as belonging to a customer service agent; and when the compared transcribed segments and clusters are each labeled as belonging to a known speaker and a customer service agent, keep the current labels, otherwise relabel the textual speaker cluster as belonging to an unknown speaker.

2. The non-transitory computer-readable medium of claim 1, wherein the identified group of speakers are customer service agents and the audio data is audio data of a customer service interaction between at least one customer service agent and at least one customer.

3. The non-transitory computer-readable medium of claim 1, wherein the specific speaker is a specific customer service agent.

4. The non-transitory computer-readable medium of claim 1, wherein the at least one heuristic is detection of a script associated with the identified group of speakers.

5. The non-transitory computer-readable medium of claim 1, wherein the analysis of the selected textual speaker clusters includes determining word use frequencies for words in the selected textual speaker clusters with the processor, determining word use frequencies for words in the non-selected textual speaker clusters with the processor, and comparing the word use frequencies for words in the selected textual speaker clusters to the word use frequencies for words in the non-selected textual speaker clusters to identify a plurality of discriminating words for use in the at least one linguistic model.

6. The non-transitory computer-readable medium of claim 1, wherein the analysis of the selected textual speaker clusters includes receiving a plurality of scripts associated with the identified group of speakers, comparing the plurality of scripts to the selected textual speaker clusters, comparing the plurality of scripts of non-selected textual speaker clusters, determining a correlation score between each of the textual speaker clusters and the plurality of scripts, identifying the group with the greatest correlation score for use in the at least one linguistic model.

7. The non-transitory computer-readable medium of claim 6, further directing the processing system to:

calculate a difference between the word use frequencies for each word in the selected textual speaker clusters and the non-selected textual speaker clusters; and compare the difference to a predetermined selection threshold, wherein if the difference is greater than the predetermined selection threshold, the word is identified as a discriminating word.

8. The non-transitory computer-readable medium of claim 1, wherein the textual speaker clusters are associated in groups of at least two, wherein the group of at least two includes a textual speaker cluster originating from the identified group of speakers and at least one textual speaker cluster originating from an other speaker, and wherein the non-selected textual speaker clusters are assumed to have originated from an other speaker.

9. The non-transitory computer-readable medium of claim 1, wherein the at least one acoustic voiceprint is a set of acoustic voiceprints for each specific customer service agent saved in the acoustic voiceprint database server.

10. The non-transitory computer-readable medium of claim 9, further directing the processing system to:

receive the set of acoustic voiceprints from the acoustic voiceprint database server;

apply the received at least one linguistic model from the linguistic database server to the new audio file transcript from an audio source to perform diarization of the new audio file by blind diarizing the new audio file and new textual transcript;

compare each new textual speaker cluster to the at least one linguistic model, and labeling each textual speaker cluster as belonging to a customer service agent or belonging to a customer;

compare each audio speaker segment to the set of acoustic voiceprints;

determine which audio speaker segments match one of the acoustic voiceprints; and label those audio speaker segments as belonging to the known speaker.

11. A method of diarization, the method comprising:

receiving a set of audio data from an audio database server at a speech-to-text (SST) server, wherein each audio data is an audio recording of a conversation between two or more speakers, wherein at least one of the two or more speakers is a customer service agent, further wherein at least one of the two or more speakers is a customer;

analyzing the audio data with the SST server to create textual transcripts for each the audio data, wherein the textual transcripts include an identification of homogeneous speaker segments;

receiving a sub-set of the textual transcripts and a sub-set of audio data for diarization, wherein the sub-set of audio data is the audio data associated with each of the sub-set of the textual transcripts;

performing a blind diarization on the sub-set of textual transcripts to segment and cluster the sub-set of textual transcripts into a plurality of textual speaker clusters, wherein the number of textual speaker clusters is at least equal to a number of speakers in each textual transcript;

applying at least one heuristic to the textual speaker clusters with a processor to select textual speaker clusters likely to be associated with an identified group of speakers;

analyzing the selected textual speaker clusters to extract a subset of the textual speaker clusters known to be spoken by the identified group of speakers;

creating at least one linguistic model based on the extracted subset of textual speaker clusters; and applying the at least one linguistic model to a new audio file transcript from an audio source to perform diarization of the new audio file by blind diarizing the new audio file, comparing each new textual speaker cluster to the at least one linguistic model, and labeling each textual speaker cluster as belonging to a customer service agent or belonging to a customer.

12. The method of claim 11, the method further comprising receiving metadata associated with each of the audio data at the SST server.

13. The method of claim 12, wherein the SST server uses the metadata associated with each of the audio data to determine at least one technique for creating each of the textual transcripts.

14. The method of claim 11, the method further comprising determining a confidence score for each of the textual transcripts.

15. The method of claim 14, wherein the subset of textual transcripts received are textual transcripts that have a high confidence score.

16. The method of claim 11, the method further comprising performing a blind diarization on the sub-set of audio data to segment and cluster the sub-set of audio data into a plurality of audio speaker clusters, wherein the number of audio speaker clusters is at least equal to a number of speakers in each audio data, wherein the number of speakers in each of the sub-set of audio data equals the number of speakers in each related textual transcript.

17. The method of claim 11, the method further comprising:

applying the linguistic model to the textual speaker clusters to label a portion of the textual speaker clusters as having been spoken by the identified group of speakers;

determining word use frequencies for words in the labeled textual speaker clusters;

determining word use frequencies for words in the non-labeled textual speaker clusters; and comparing the word use frequencies for words in the selected transcripts to the word use frequencies for words in the non-selected transcripts with the processor to identify a plurality of discriminating words in the selected transcripts to be added to the at least one linguistic model.

18. The method of claim 11, the method further comprising saving the at least one linguistic model to a linguistic database server and associating it with the identified group of speakers.

19. The method of claim 11, wherein the at least one heuristic is detection of a script associated with the identified group of speakers.

20. The method of claim 11, wherein the identified group of speakers are customer service agents.

* * * * *